(12) United States Patent
Kesler et al.

(10) Patent No.: US 10,378,686 B2
(45) Date of Patent: Aug. 13, 2019

(54) PLASTIC SEAL FITTING

(71) Applicant: Hanon Systems, Daejeon (KR)

(72) Inventors: Eric Kesler, Northville, MI (US);
Michael Sproule, Brighton, MI (US);
Steve White, Pinckney, MI (US)

(73) Assignee: HANON SYSTEMS, Daejeon (KR)

( * ) Notice: Subject to any disclaimer, the term of this patent is extended or adjusted under 35 U.S.C. 154(b) by 227 days.

(21) Appl. No.: 15/465,005

(22) Filed: Mar. 21, 2017

(65) Prior Publication Data

US 2018/0010719 A1 Jan. 11, 2018

Related U.S. Application Data

(60) Provisional application No. 62/360,058, filed on Jul. 8, 2016.

(51) Int. Cl.

| | |
|---|---|
| *F16L 23/032* | (2006.01) |
| *F16L 21/00* | (2006.01) |
| *F16L 21/02* | (2006.01) |
| *F16L 23/16* | (2006.01) |
| *F16L 23/22* | (2006.01) |
| *B60H 1/00* | (2006.01) |
| *F16L 23/028* | (2006.01) |
| *F16L 47/14* | (2006.01) |

(52) U.S. Cl.
CPC ........ *F16L 21/002* (2013.01); *B60H 1/00571* (2013.01); *F16L 21/022* (2013.01); *F16L 23/0283* (2013.01); *F16L 23/032* (2013.01); *F16L 23/16* (2013.01); *F16L 23/162* (2013.01); *F16L 23/22* (2013.01); *F16L 47/14* (2013.01)

(58) Field of Classification Search
CPC ...... F16L 23/032; F16L 23/0283; F16L 23/16
USPC ................................ 285/205, 206, 207, 208
See application file for complete search history.

(56) References Cited

U.S. PATENT DOCUMENTS

| | | | |
|---|---|---|---|
| 3,399,908 A | * | 9/1968 | Kurtz ................. F16L 23/0283 285/334.5 |
| 4,140,739 A | | 2/1979 | Cotten |
| 4,316,870 A | | 2/1982 | Rowley |
| 4,383,966 A | | 5/1983 | Svetlik |

(Continued)

FOREIGN PATENT DOCUMENTS

| | | | | |
|---|---|---|---|---|
| CA | 2324571 A1 | * | 4/2001 | ......... B60H 1/00571 |
| CN | 101238320 A | | 8/2008 | |

(Continued)

*Primary Examiner* — David Bochna
(74) *Attorney, Agent, or Firm* — Shumaker, Loop & Kendrick, LLP; James D. Miller

(57) ABSTRACT

A seal assembly for an HVAC system includes a first block having a first aperture and a first sealing surface, a second block having a second aperture and a second sealing, and a conduit having a tube portion with an axially extending aperture and a flange extending radially outwardly from an end of the tube portion. The tube portion is disposed within the first aperture of the first block and the flange is disposed between the first sealing surface of the first block and the second sealing surface of the second block and is configured to deform when compressed therebetween. The seal assembly further includes an insert providing fluid communication between the aperture of the tube portion and the second aperture of the second block. A first end of the insert is received in the aperture of the tube portion of the conduit.

18 Claims, 9 Drawing Sheets

(56) References Cited

U.S. PATENT DOCUMENTS

| | | | | |
|---|---|---|---|---|
| 5,603,152 | A * | 2/1997 | Le | F16L 23/032 285/24 |
| 5,827,467 | A | 10/1998 | Ruppert et al. | |
| 5,853,201 | A * | 12/1998 | Izumi | B60H 1/00571 285/205 |
| 6,070,659 | A * | 6/2000 | Hosoya | F28D 1/0341 285/206 |
| 6,318,768 | B1 * | 11/2001 | Gehres | F16L 23/032 277/609 |
| 6,969,094 | B2 * | 11/2005 | Frohling | F16L 23/032 285/205 |
| 7,407,165 | B1 * | 8/2008 | Chisnell | F16L 23/16 277/603 |
| 7,621,568 | B2 * | 11/2009 | Schroeder | F16J 15/061 285/205 |
| 7,712,788 | B2 * | 5/2010 | Wildermuth | B60H 1/00571 285/205 |
| 7,766,391 | B2 * | 8/2010 | Kim | F16L 23/18 285/205 |
| 8,827,318 | B2 * | 9/2014 | Watanabe | F16L 23/22 285/205 |
| 2005/0023828 | A1 * | 2/2005 | Takeuchi | F16L 23/032 285/205 |
| 2007/0007768 | A1 * | 1/2007 | Ho | F16L 23/0283 285/368 |
| 2007/0222159 | A1 * | 9/2007 | Baxi | F16L 23/032 277/365 |
| 2010/0032941 | A1 * | 2/2010 | Cabezas | F16L 23/032 285/55 |
| 2011/0214755 | A1 * | 9/2011 | Kesler | F16L 23/0283 137/468 |
| 2017/0059064 | A1 * | 3/2017 | Thrift | F16L 23/032 |

FOREIGN PATENT DOCUMENTS

| | | | | |
|---|---|---|---|---|
| DE | 10245477 | A1 * | 4/2004 | .......... F16L 23/0283 |
| DE | 102008044095 | A1 * | 7/2009 | ............ F16L 23/032 |
| EP | 0937935 | A1 * | 8/1999 | .......... F16L 23/0283 |
| EP | 1873437 | A2 * | 1/2008 | ......... B60H 1/00571 |
| EP | 2103857 | A1 * | 9/2009 | ............ F16L 23/032 |
| EP | 2366919 | A2 | 9/2011 | |
| EP | 2977665 | A3 * | 5/2016 | ............ F16L 23/032 |
| GB | 880357 | A * | 10/1961 | .......... F16L 23/0283 |
| JP | 2013068268 | A * | 4/2013 | .......... F16L 23/0283 |
| KR | 100704645 | B1 | 4/2007 | |
| KR | 20090037130 | A | 4/2009 | |
| KR | 20120059028 | A | 6/2012 | |
| KR | 101187042 | B1 | 9/2012 | |
| KR | 101342943 | B1 | 12/2013 | |
| WO | 2008077013 | A2 | 6/2008 | |
| WO | WO-2013042573 | A1 * | 3/2013 | ............ F16L 23/036 |
| WO | WO-2013190803 | A1 * | 12/2013 | ............ F16L 23/003 |

* cited by examiner

PLASTIC SEAL FITTING

CROSS-REFERENCE TO RELATED APPLICATION

This application claims priority to U.S. Provisional Application Ser. No. 62/360,058, filed Jul. 8, 2016, the entire disclosure of which is hereby incorporated herein by reference.

FIELD OF THE INVENTION

The invention relates generally to an apparatus for connecting fluid lines, and particularly, to an apparatus for connecting high-pressure plastic fluid lines in a heating, ventilation, and air conditioning system of a motor vehicle.

BACKGROUND

Fluid lines for heating, ventilation, and air-conditioning (HVAC) systems in motor vehicles have traditionally been formed of metal due to the relatively high pressures of the fluids contained therein. However, there is a continuing effort in the automotive industry to reduce weight of individual vehicle components in order to improve overall vehicle efficiency.

In an effort to minimize weight, plastic fluid lines have been considered as one alternative to metal fluid lines. However, plastic fluid lines are typically configured having a radial sealing means to facilitate quick connection. Radial sealing means, such as o-rings, are known to have higher leakage rates compared to axial sealing means, such as gaskets. Accordingly, axial sealing means are preferred in order to minimize leakage.

Although axial sealing means provide improved sealing over radial sealing means, axial sealing means are more likely to experience reduced effectiveness over time when used in conjunction with plastic fittings. In order to maintain a sufficient seal, an axial sealing means must be compressed in an axial direction between opposing surfaces of fittings. However, plastic fittings are susceptible to material creep, and an initial compressive force applied during assembly of the fittings may decrease over time as the plastic fittings "relax" as a result of the material creep. Thus, although axial sealing means provide superior initial performance compared to radial sealing means, axial sealing fittings are more susceptible to failure when used with plastic fittings.

Accordingly, there exists a need in the art for a means of providing an axial sealing means between plastic fluid lines, wherein the axial sealing means is not affected the material creep of the plastic fittings.

SUMMARY OF THE INVENTION

In concordance with the instant disclosure, a means of providing an axial sealing means between plastic fluid lines, wherein the axial sealing means is not affected by the material creep of plastic fittings, is surprisingly discovered.

In one embodiment, a seal assembly for a heating, ventilation, and air-conditioning system comprises a first block having a first aperture and a first sealing surface extending radially outwardly from an end of the first aperture, a second block having a second aperture and a second sealing surface extending radially outwardly from an end of the second aperture, and a conduit having a tube portion with an axially extending aperture and a flange extending radially outwardly from an end of the tube portion. The tube portion is disposed within the first aperture of the first block and the flange is disposed between the first sealing surface of the first block and the second sealing surface of the second block and is configured to deform when compressed therebetween. The seal assembly further includes an insert providing fluid communication between the aperture of the tube portion and the second aperture of the second block. A first end of the insert is received in the aperture of the tube portion of the conduit.

BRIEF DESCRIPTION OF THE DRAWINGS

The above objects and advantages of the invention, as well as others, will become readily apparent to those skilled in the art from reading the following detailed description of a preferred embodiment of the invention when considered in the light of the accompanying drawings, in which.

DETAILED DESCRIPTION OF THE INVENTION

Figure 1:
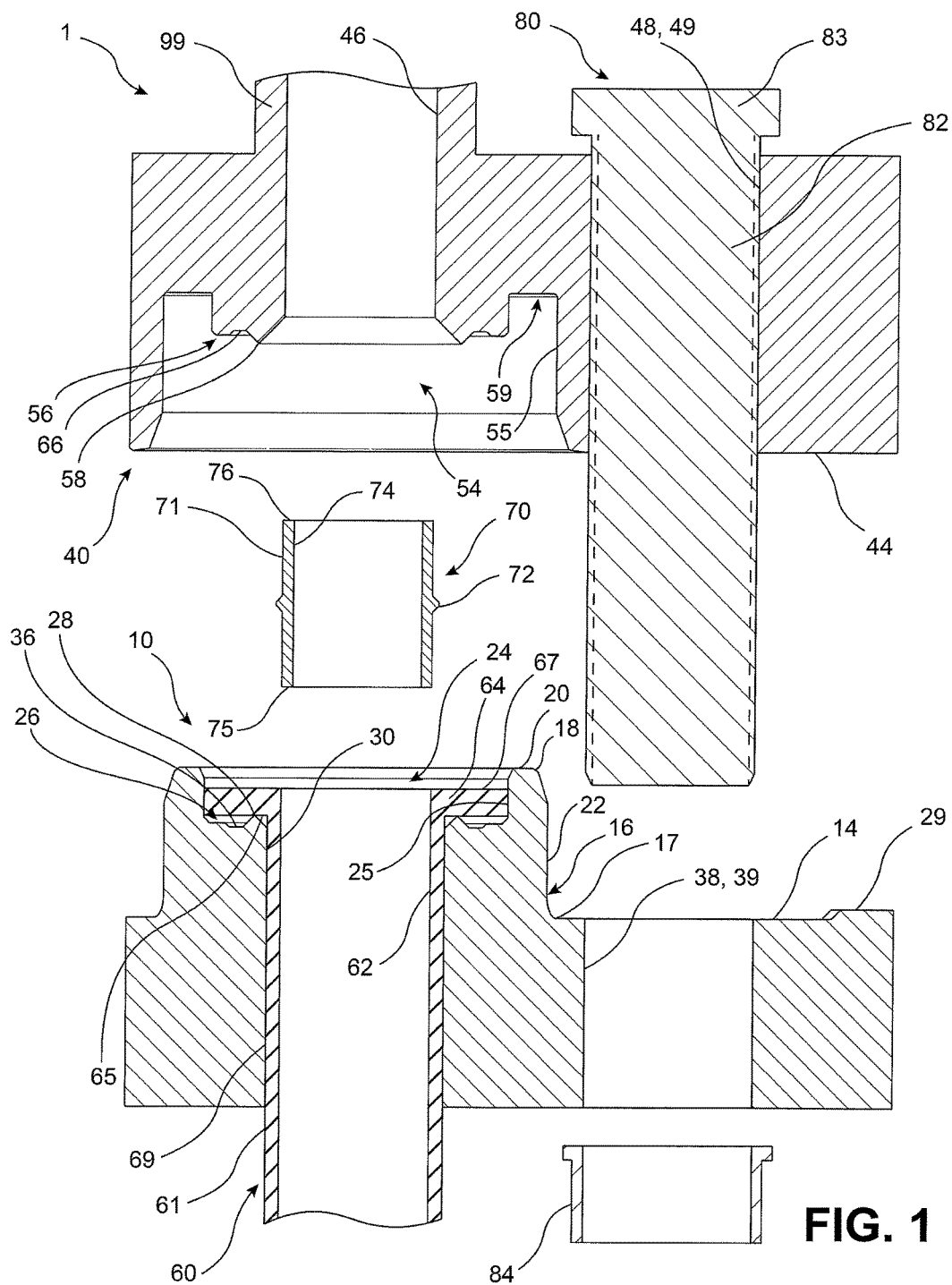
FIG. 1 is a partially exploded cross-sectional elevational view of a seal assembly including a conduit having a flange according to an embodiment of the invention.

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

FIGS. 1-4 show a seal assembly 1 according to one embodiment of the instant disclosure. The seal assembly 1 is hereinafter described for use in an HVAC system of a motor vehicle, but it is understood that the seal assembly 1 may be used for coupling any two fluid conveying components or fluid lines together where a fluid tight seal is desired. The seal assembly 1 includes a first block 10, a second block 40, a conduit 60, an insert 70, and a clamping feature 80. As shown, the first block 10 forms a male component and the second block 40 forms a female component of the seal assembly 1. The first block 10 and the second block 40 are each formed of a rigid material having a minimized creep rate. For example, metals such as steel, aluminum, or brass have been found to perform favorably. Those of ordinary skill in the art will appreciate that other materials having a low or minimized creep rate may be suitable as well. The first block 10 and the second block 40 may be formed from a non-polymeric material having the suitable characteristics, for example, but it should be understood that a polymeric material having the desired characteristics for rigidity and creep rate may be used without departing from the scope of the present invention.

The first block 10 includes a main body having a substantially planar first mating face 14 and a boss 16 extending substantially perpendicularly from the first mating face 14. The boss 16 may include a substantially cylindrical outer surface, but other configurations of the outer surface of the boss 16 may also be utilized such as a square or hexagonal outer surface configuration, as desired. The boss 16 includes a first end 17 intersecting the first mating face 14 and a second end 18 spaced from the first mating face 14 in an axial direction of the boss 16. The second end 18 of the boss 16 defines a peripheral rim 20 thereof. The peripheral rim 20 may be inwardly tapered to form a locating feature of the boss 16 for cooperating with a portion of the second block 40, as explained hereinbelow.

The peripheral rim 20 circumscribes a substantially cylindrical first recess 24 formed in the boss 16. The first recess 24 extends in the axial direction of the boss 16 from the second end 18 thereof toward the first end 17 thereof. The first recess 24 is defined by an inner circumferential surface 25 and a first sealing surface 26 of the boss 16. The inner circumferential surface 25 is formed opposite an outer circumferential surface 22 of the boss 16. The inner circumferential surface 25 of the boss 16 extends in the axial direction of the boss 16 from the second end 18 thereof to a position intermediate the first end 17 and the second end 18 thereof, but alternative depths of the first recess 24 may be used without departing from the scope of the present invention.

The first sealing surface 26 extends radially inwardly from the inner circumferential surface 25 and terminates at a first aperture 30 of the boss 16. The first aperture 30 is cylindrical in shape and formed concentrically with respect to the first recess 24. The first aperture 30 extends in the axial direction of the boss 16 perpendicular to the first mating face 14 of the first block 10. The first aperture 30 extends through an entirety of the first block 10 and is configured to receive a portion of the conduit 60 therein.

The first sealing surface 26 includes at least one engaging feature 28 formed intermediate the inner circumferential surface 25 and the first aperture 30 of the boss 16. The at least one engaging feature 28 is configured to prevent radial movement of at least a portion of the conduit 60 disposed within the first recess 24 while also sealingly engaging the portion of the conduit 60, as explained in greater detail hereinbelow. The first sealing surface 26 is illustrated in FIGS. 1-4 as having a single annular engaging feature 28 formed adjacent the first aperture 30. The engaging feature 28 forms an axially extending projection or rib configured to impart a localized compressive stress on the portion of the conduit 60 disposed within the first recess 24.

The engaging feature 28 is shown in FIGS. 1-4 as having a substantially V-shaped cross-sectional shape including a sharp edge formed at a distal end of the engaging feature 28, wherein a pair of tapering surfaces forming the engaging feature intersect. The sharpness of the edge of the engaging feature 28 may be selected so as not to disadvantageously penetrate the portion of the conduit 60 disposed within the first recess 24 while also imparting the desired degree of compressive stress to the portion of the conduit 60.

Figure 5:
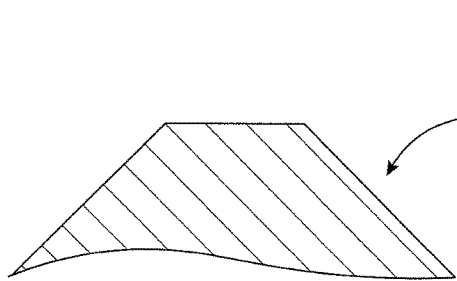
FIGS. 5-10 illustrate various configurations of an engaging feature of the seal assembly of FIGS. 1-4.
Figure 6:
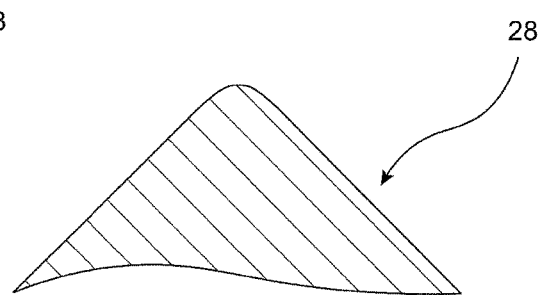
Figure 7:
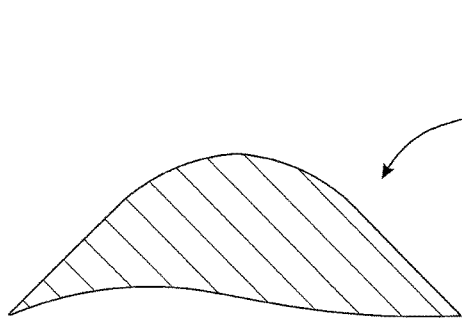
Figure 8:
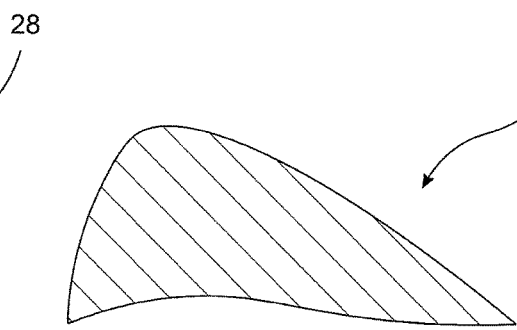
Figure 9:
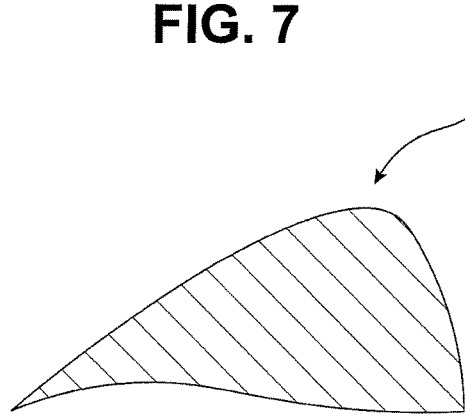
Figure 10:
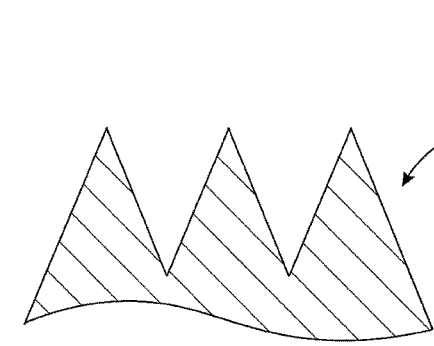

For example, FIGS. 5-10 illustrate various different possible configurations of the engaging feature 28 having different cross-sectional shapes for imparting a differing compressive stress on the portion of the conduit 60. FIG. 5 illustrates the engaging feature 28 as having a substantially trapezoidal cross-sectional shape to minimize the localized stress distributed to a distal end of the engaging feature 28. FIG. 6 illustrates the engaging feature 28 as having a curved distal end having a relatively small radius of curvature while FIG. 7 illustrates the engaging feature 28 as having a curved distal end having a relatively large radius of curvature. FIGS. 8 and 9 illustrate the engaging feature 28 as having oblique cross-sectional shapes wherein one of the inwardly tapering surfaces is inclined at a different angle in comparison to the other of the inwardly tapering surfaces. The engaging features 28 are shown as having radiused distal ends in FIGS. 8 and 9, but it should be further understood that sharper edges similar to that disclosed in FIGS. 1-4 may be used, as desired. FIG. 10 illustrates a configuration wherein the engaging feature 28 includes a plurality of tapered projections formed immediately adjacent each other in a saw-tooth configuration. One skilled in the art should appreciate that alternative configurations of the engaging feature 28 may be used without departing from the scope of the present invention so long as the engaging feature 28 is suitable for delivering the desired localized compressive stress to the portion of the conduit 60 disposed within the first recess 24.

The first sealing surface 26 further includes at least one cavity 36 formed therein. The at least one cavity 36 forms a depression in the first sealing surface 26 extending in a direction opposing the direction of extension of each of the engaging features 28 of the first sealing surface 26. FIGS. 1-4 illustrate the first sealing surface 26 as including a single annular cavity 36 formed adjacent and radially outward of the engaging feature 28. The cavity 36 is shown as having a substantially trapezoidal cross-sectional shape, but other shapes may be used without departing from the scope of the present invention. For example, the cavity 36 may have a semi-circular shape, a tapered triangular shape with a relatively small radius of curvature at a distal end thereof, a tapered triangular shape with a relatively large radius of curvature at a distal end thereof, or an oblique angled shape, as non-limiting examples. The cavity 36 is configured to receive at least a portion of the conduit 60 therein as is explained in greater detail below.

The first sealing surface 26 may include any number of the engaging features 28 and any number of the cavities 36, as desired. In some embodiments, the first sealing surface 26 includes a plurality of the engaging features 28 interposed in alternating fashion between each of the cavities 36, as desired. Any suitable configuration of the engaging features 28 and the cavities 36 may be used without departing from the scope of the present invention.

The first block 10 further includes a first clamping aperture 38 and a leverage feature 29. The first clamping aperture 38 extends through the first block 10 and is spaced laterally from and arranged parallel to the first aperture 30 of the boss 16. The first clamping aperture 38 may be substantially cylindrical in shape and may include a threaded inner surface 39 configured to cooperate with a threaded member 82, such as a bolt. The leverage feature 29 may be formed at an end of the first mating face 14 adjacent the first clamping aperture 38. The leverage feature 29 may take the form of a fulcrum extending away from the first mating face 14 in the axial direction of the first clamping aperture 38. The leverage feature 29 may be substantially heel-like in appearance as the leverage feature 29 extends away from the first mating face 14 of the first block 10.

The second block 40 includes a main body having a substantially planar second mating face 44. The main body includes a second recess 54 extending axially from the second mating face 44 in a direction perpendicular thereto. The second recess 54 includes an axially extending inner circumferential surface 55 having an inner diameter substantially equal to an outer diameter of the boss 16 of the first block 10 and a second sealing surface 56 extending radially inwardly from the inner circumferential surface 55. An axially extending annular groove 59 is formed at the intersection of the inner circumferential surface 55 and the second sealing surface 56. The annular groove 59 is configured to receive the peripheral rim 20 of the first block 10 therein. It should also be understood that the boss 16 of the first block 10 may be formed in the absence of the peripheral rim 20 and the second block 40 may be formed in the absence of the annular groove 59 without departing from the scope of the present invention.

The second sealing surface 56 extends radially inwardly from the annular groove 59 and terminates at a second aperture 46 of the second block 40. The second aperture 46 is cylindrical in shape and formed concentrically with the annularly extending second recess 54. The second aperture 46 extends in the axial direction of the second recess 54 perpendicular to the second mating face 44 of the second block 40. The second aperture 46 extends through the second block 40 and is configured to convey a fluid therethrough. The second aperture 46 has an inner diameter smaller than an inner diameter of the first aperture 30, as explained in greater detail hereinbelow.

The second sealing surface 56 includes at least one engaging feature 58 formed intermediate the inner circumferential surface 55 and the second aperture 46. The at least one engaging feature 58 is configured to prevent radial movement of at least a portion of the conduit 60 disposed within the recess 54, while also sealingly engaging the portion of the conduit 60. The second sealing surface 56 is illustrated with a single annular engaging feature 58 formed adjacent the second aperture 46. The engaging feature 58 forms an axially extending projection or rib configured to impart a localized compressive stress on the portion of the conduit 60 disposed within the recess 54.

The engaging feature 58 is shown having a substantially V-shaped cross-sectional shape including a sharp edge formed at a distal end, wherein a pair of tapering surfaces forming the engaging feature intersect. The engaging feature 58 may be formed in radial alignment with the engaging feature 28 of the first block 10 to cause the engaging features 28, 58 to impart a localized compressive stress to the portion of the conduit 60 disposed therebetween. The sharpness of the edge of the engaging feature 58 may be selected so as not to disadvantageously penetrate the portion of the conduit 60 disposed within the recess 54 while also imparting the desired degree of compressive stress to the portion of the conduit 60. The engaging feature 58 may alternatively have one of the configurations illustrated in FIGS. 5-10, including a trapezoidal cross-sectional shape, a radiused cross-sectional shape, an oblique cross-sectional shape, and a sawtooth profiled cross-sectional shape, as non-limiting examples.

The second sealing surface 56 further includes at least one cavity 66 formed therein. The at least one cavity 66 forms a depression in the second sealing surface 56 extending in a direction opposing the direction of each of the engaging features 58 of the second sealing surface 56. FIGS. 1-4 illustrate the second sealing surface 56 as including a single annularly extending cavity 66 formed adjacent and outboard of the engaging feature 58. The cavity 66 is shown as having a substantially trapezoidal cross-sectional shape, but other shapes such as those described with reference to the cavity 36 may also be used without departing from the scope of the present invention. The cavity 66 is configured to receive at least a portion of the conduit 60 therein as is explained in greater detail hereinbelow.

The second sealing surface 56 may include any number of the engaging features 58 and any number of the cavities 66, as desired. In some embodiments, the second sealing surface 56 includes a plurality of the engaging features 58 interposed in alternating fashion between each of the cavities 66. The engaging features 58 and the cavities 66 may be selected to in each case be in radial alignment with corresponding ones of the engaging features 28 and the cavities 36, as desired. Any suitable configuration of the engaging features 58 and the cavities 66 may be used without departing from the scope of the present invention.

The second block 40 further includes a second clamping aperture 48 spaced apart from and arranged in parallel to the second aperture 46. The second clamping aperture 48 is substantially cylindrical in shape and may include a threaded inner surface 49 configured to cooperate with the threads formed on the threaded member 82. As should be understood, the second clamping aperture 48 of the second block 40 is positioned in alignment with the first clamping aperture 38 of the first block 10 during assembly of the seal assembly 1.

The first clamping aperture 38, the second clamping aperture 48, and the threaded member 82 cooperate to form the clamping feature 80 of the seal assembly 1. The threaded member 82 may further include a head 83 formed at one end for abutting a portion of the second block 40 and a nut 84 configured to be received on the end of the threaded member 82 opposite the head 83. The clamping feature 80 is configured to urge the first block 10 towards the second block 40. For example, the nut 84 of the threaded member 82 may be rotated relative to the threaded member 82 to move the nut 84 towards the head 83 while causing a spacing present between the first mating face 14 and the second mating face 44 to decrease. The first clamping aperture 38 and the second clamping aperture 48 are described as including threaded surfaces, but it should be understood by one skilled in the art that only one or neither of the clamping apertures 38, 48 may include the threaded surfaces thereof if the portion of the threaded member 82 engaging the nut 84 is threaded in a manner suitable for forcing the first block 10 towards the second block 40. Additionally, one skilled in the art should further appreciate that any form of clamping feature 80 suitable for urging the first block 10 towards the second block 40 in the manner described may be used without departing from the scope of the present invention. For example, the clamping feature 80 utilizing the threaded member 82 may be replaced with any form of clamp used to force the first block 10 towards the second block 40, as desired.

The conduit 60 includes a cylindrical tube portion 61 having an axially extending aperture 62 formed therethrough. A substantially cylindrical flange 64 extends radially outwardly from an end of the tube portion 61. The flange 64 includes a first surface 65 extending radially outwardly from an outer circumferential surface 69 of the tube portion 61 and a second surface 67 extending radially outwardly from an end of the aperture 62. The first surface 65 and the second surface 67 are substantially planar and arranged substantially in parallel. When the conduit 60 is installed in the seal assembly 1, the first surface 65 of the flange 64 is in facing relationship with the first sealing surface 26 of the first block 10 while the second surface 67 of the flange 64 is in facing relationship with the second sealing surface 56 of the second block 40.

The conduit 60 is formed of a material selected based on a combination of properties, including weight and plasticity. Particularly, the flange 64 of the conduit 60 is formed of a material that can be elastically displaced when the engaging features 28, 58 of the sealing surfaces 26, 56 are compressed into the flange 64, and can return toward an original shape when the engaging features 28, 58 are removed, as described hereinbelow. The conduit 60 may be formed of a plastic or polymeric material. More particularly, the conduit 60 may be formed of a thermoplastic polymer, such as polyethylene, polypropylene, polyethylene terephthalate, polyketone, polyamide, polyphenylene sulfide, and variations and combinations thereof. In alternate embodiments, the conduit 60 may be formed of a thermoset polymer or a thermoplastic elastomer, where those materials exhibit suitable plasticity.

The conduit 60 may be preformed to include the flange 64 or the flange 64 may be formed during a process of assembling the seal assembly 1. For example, the conduit 60 may begin as a cylindrical tube devoid of the flange 64. The conduit 60 may then be inserted into the first aperture 30 of the first block 10 until an end of the conduit 60 extends beyond the first sealing surface 26. The insertion of the conduit 60 into the first aperture 30 may include the conduit 60 being loosely received within the first aperture 30, the conduit 60 being frictionally received within the first aperture 30, or the conduit 60 being mechanically engaged with the first aperture 30 such as by means of cooperating threading formed on each of the outer circumferential surface of the conduit 60 and a portion of the first block 10 defining the first aperture 30.

The portion of the conduit 60 extending axially beyond the first sealing surface 26 is then deformed radially outwardly to form the flange 64 of the conduit 60. In one embodiment, the conduit 60 is formed of the thermoplastic material and the formation of the flange 64 includes heating the end of the conduit 60 near to or above a respective melting or softening temperature of the conduit 60 to allow for the end of the conduit 60 to be deformed in the radial outward direction. The deformation of the end of the conduit 60 may include molding the end into the general configuration of the flange 64. In alternate embodiments, the flange 64 may be pre-formed on the distal end of the conduit 60, wherein the end of the conduit 60 opposite of the flange 64 is inserted through the first aperture 30 of the first block 10 to prevent interference between the flange 64 and the first aperture 30.

Figure 11:
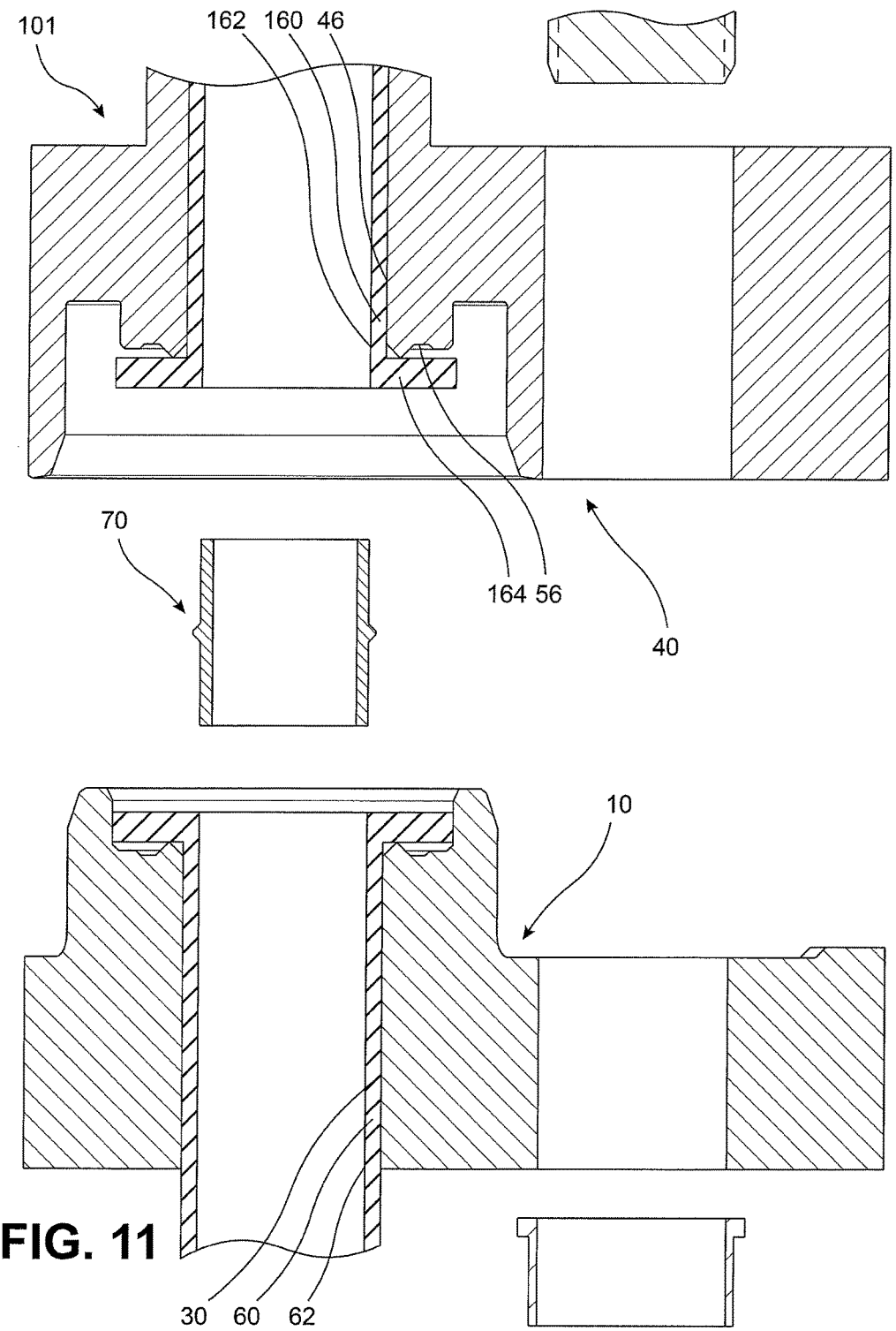
FIG. 11 is a partially exploded cross-sectional elevational view of a seal assembly configured as an inline fitting according to another embodiment of the invention.

In the embodiment shown, the first block 10 forms a male block independently formed and configured to receive the conduit 60 while the second block 40 forms a female block formed integrally with a component 99 of an HVAC system, wherein the conduit 60 is configured to receive a flow of a fluid associated with the component 99 of the HVAC system. However, it will be appreciated that the male block and the female block may be used interchangeably, wherein either one of the blocks 10, 40 can be formed independently and the other one of the blocks 10, 40 can be integrally formed with the HVAC component. Alternatively, both of the blocks 10, 40 may be formed independently and configured to receive a conduit 60 therein, wherein the seal assembly 1 functions as an inline fitting, as shown in FIG. 11, which is described in greater detail hereinbelow.

The insert 70 is a thin-walled cylindrical tube formed of a rigid material. The insert 70 includes an axially extending aperture 74 providing fluid communication between a first end 75 and a second end 76 of the insert 70. The insert 70 may include an annular bead 72 circumscribing an outer circumferential surface 71 of the insert 70 intermediate the first end 75 and the second end 76 thereof, wherein an outer diameter of the annular bead 72 is greater than an inner diameter of each of the aperture 62 of the conduit 60 and the second aperture 46 of the second block 40.

The first end 75 of the insert 70 is configured to be sealingly received in the aperture 62 of the conduit 60 and the second end 76 of the insert 70 is configured to be sealingly received in the second aperture 46 of the second block 40. In the illustrated embodiment, an outer diameter of the outer circumferential surface 71 of the insert 70 at each of the first end 75 and the second end 76 thereof is configured to be frictionally received within the inside diameters of each of the aperture 62 of the conduit 60 and the second aperture 46 of the second block 40.

The formation of the seal assembly 1 is completed as follows. As explained above, the conduit 60 may be formed with or without the flange 64 preformed at one end thereof. If the conduit 60 includes the preformed flange 64, the conduit 60 may be inserted through the first aperture 30 of the first block 10 until the flange 64 abuts the first sealing surface 26. Alternatively, the conduit 60 may be fed through the first aperture 30 until one end of the conduit 60 is positioned to be deformed radially outwardly beyond the intersection of the first sealing surface 26 and the first aperture 30 to form the flange 64. In either case, the conduit 60 is inserted into the first aperture 30 of the first block 10 in a manner wherein the flange 64 of the conduit 60 abuts at least a portion of the first sealing surface 26 of the first block 10.

Next, the first end 75 of the insert 70 is frictionally inserted into the aperture 62 of the conduit 60 until the annular bead 72 engages the second surface 67 of the flange 64. The boss 16 of the first block 10 including the conduit 60 and the insert 70 is then received into the second recess 54 of the second block 40. The peripheral rim 20 of the boss 16 is located in the annular groove 59 of the second recess 54 to properly locate the first block 10 relative to the second block 40. The first clamping aperture 38 of the first block 10 and the second clamping aperture 48 are also aligned with each other to allow for the threaded member 82 to be received therethrough. The insertion of the boss 16 into the second recess 54 further includes the second end 76 of the insert 70 frictionally received within the inner diameter of the second aperture 46 of the second block 40. The boss 16 may, for example, be inserted into the second recess 54 until the annular bead 72 of the insert 70 is disposed immediately adjacent or in engagement with the second sealing surface 56 of the second block 40.

Figure 2:
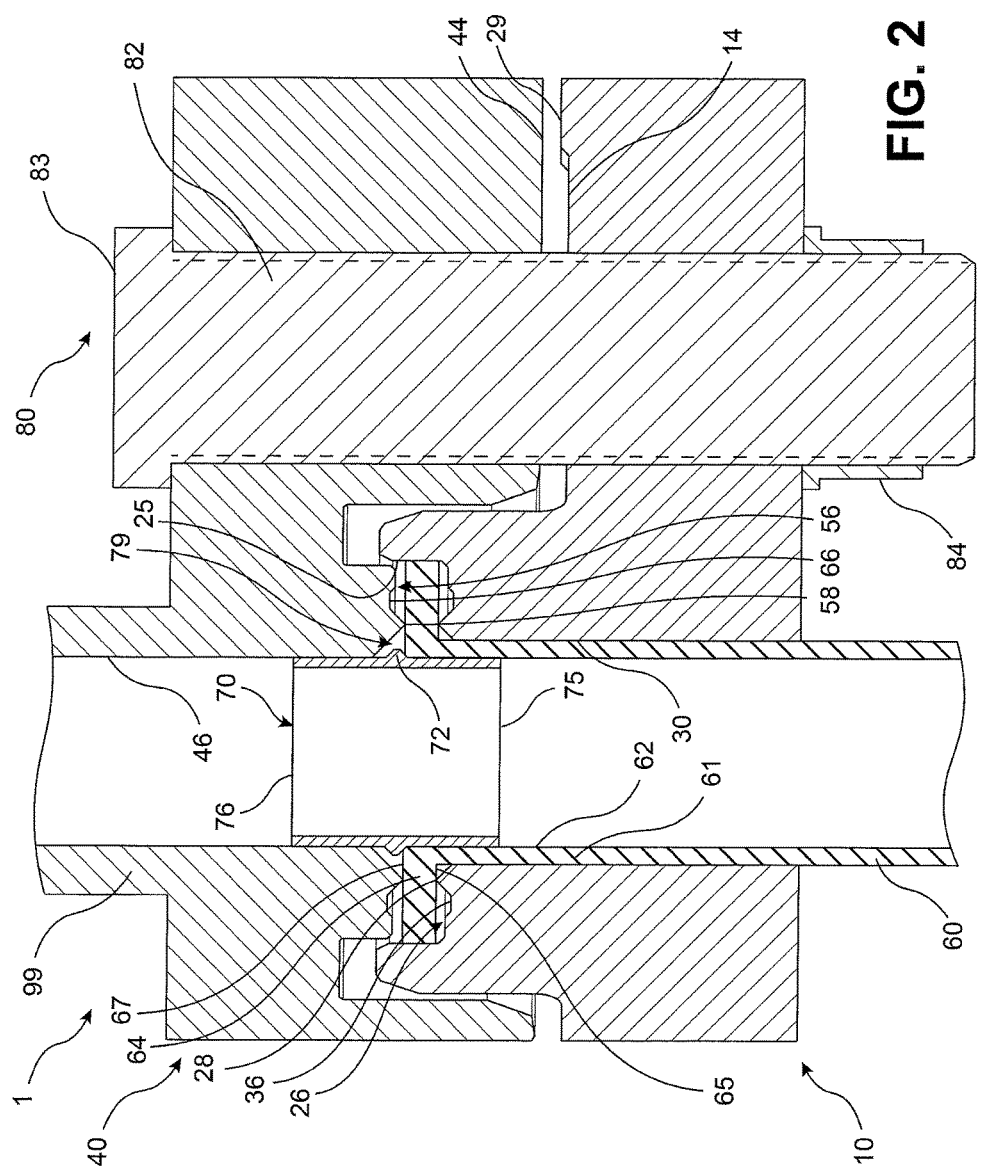
FIG. 2 is a cross-sectional elevational view of the seal assembly of FIG. 1 prior to the flange of the conduit being fully compressed by the seal assembly.
Figure 3:
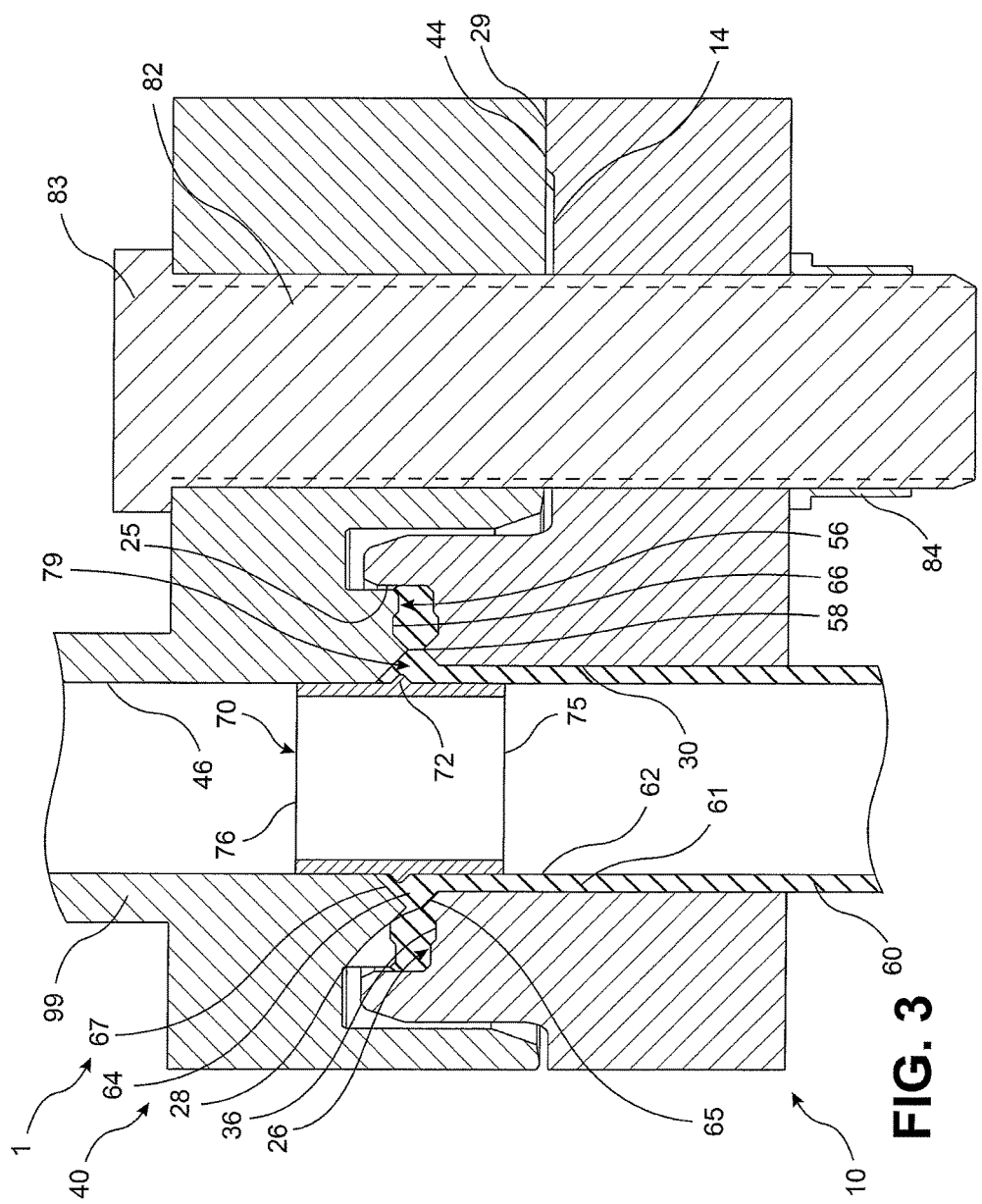
FIG. 3 is a cross-sectional elevational view of the seal assembly of FIG. 1 when the flange of the conduit is fully compressed by the seal assembly.
Figure 4:
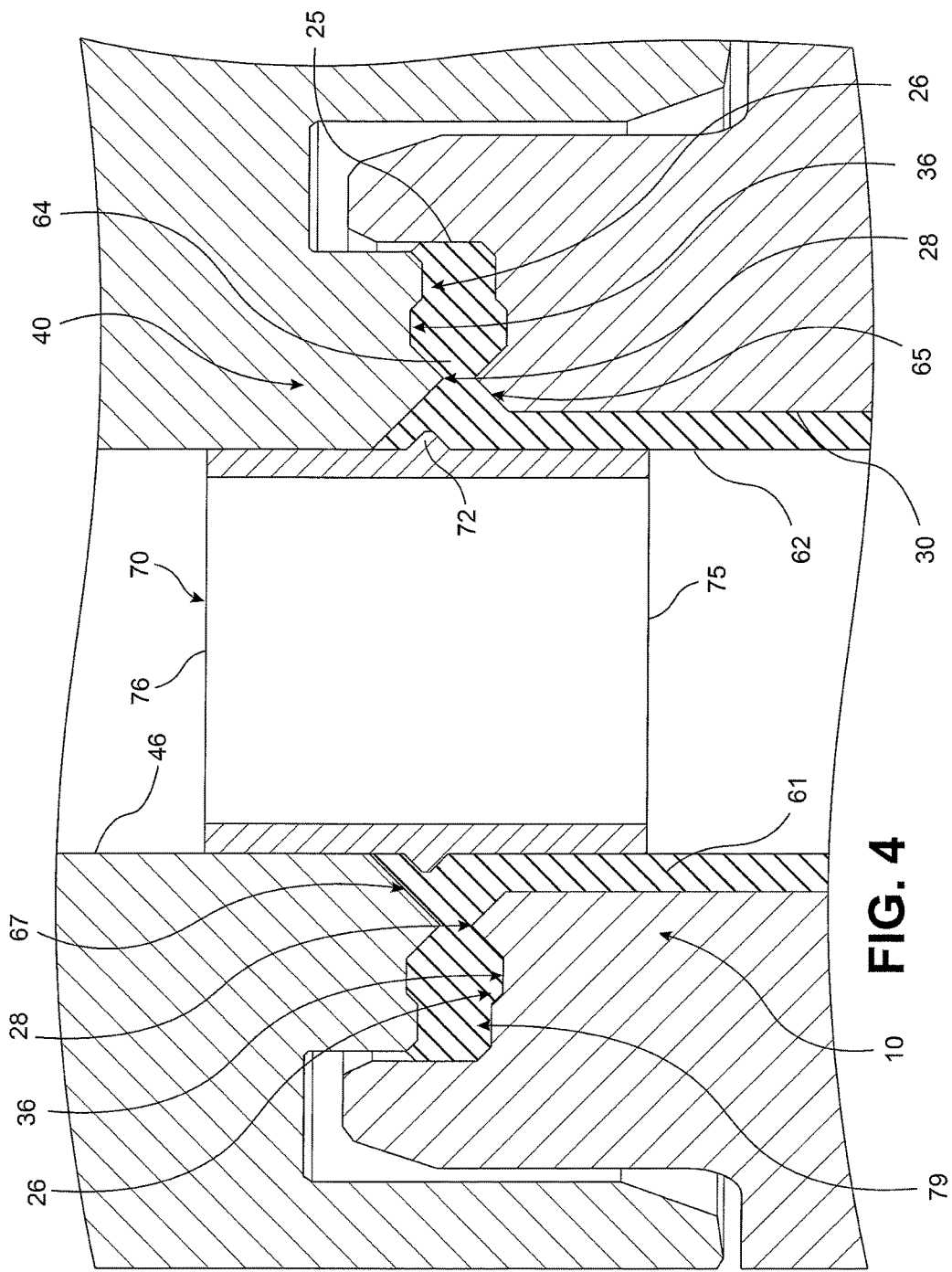
FIG. 4 is an enlarged fragmentary cross-sectional elevational view of the seal assembly of FIG. 3 showing the flange of the conduit in the fully compressed condition.

FIG. 2 illustrates the seal assembly 1 when the first surface 65 of the flange 64 is first in engagement with the engaging feature 28 of the first sealing surface 26 while the second surface 67 of the flange 64 is in engagement with the engaging feature 58 of the second sealing surface 56. The threaded member 82 has been fed through the first and second clamping apertures 38, 48 and the nut 84 has been rotated to place the first mating face 14 of the first block 10 adjacent the second mating face 44 of the second block 40 wherein the leverage feature 29 of the first block 10 is almost in engagement with the second mating face 44.

The configuration shown in FIG. 2 corresponds to a positioning of the first block 10 relative to the second block 40 prior to a fully sealed configuration of the seal assembly 1 being attained. The inner circumferential surface 25 of the first recess 24, the first sealing surface 26, the second sealing surface 56, and the outer circumferential surface 71 of the insert 70 cooperate to form an annular gland 79 for receiving the flange 64 of the conduit 60.

The nut 84 of the threaded member 82 is then further rotated to continue to reduce the spacing formed between the first sealing surface 26 and the second sealing surface 56, thereby continually reducing the volume of the annular gland 79. The engaging feature 28 and the engaging feature 58, which are in radial alignment with each other, are brought closer together to impart a localized compressive stress on the flange 64 of the conduit 60. As the engaging features 28, 58 advance into the flange 64, the material forming the flange 64 is displaced by the engaging features 28, 58 and flows into the cavities 36, 66 of the sealing surfaces 26, 56. The sealing surfaces 26, 56 are then continually advanced towards each other until a volume of the gland 79 is approximately 100% filled by the deformed flange 64. The material forming the flange 64 completely fills the gland 79 to hydrostatically lock the gland 79, thereby preventing material creep and maximizing a sealing capability of the seal assembly 1 during thermal cycling of the seal assembly 1.

During the drawing of the first block 10 towards the second block 40 by rotation of the nut 84 of the clamping feature 80, the leverage feature 29 of the first block 10 eventually makes contact with the second mating face 44 of the second block 40. The clamping force provided by the clamping feature 80 is therefore applied to a portion of the seal assembly 1 intermediate the engagement of the leverage feature 29 with the second block 40 and the engagement of the first and second sealing surfaces 26, 56 to the flange 64 of the conduit 60. The leverage feature 29 is therefore configured to oppose the bias applied by the clamping feature 80, thereby also biasing the sealing surfaces 26, 56 of the blocks 10, 40 together to maximize the compressive stress on the flange 64 of the conduit 60.

The leverage feature 29 also advantageously provides a space between the opposing mating faces 14, 44 of the blocks 10, 40 when the design torque of the clamping feature 80 of the seal assembly 1 has been reached. As the seal assembly 1 is disassembled and reassembled over the life of the HVAC system having the seal assembly 1, the flange 64 may experience plastic deformation, wherein the flange 64 does not return entirely to its original shape upon disassembly of the seal assembly 1. Thus, the spacing formed by the leverage feature 29 allows the spacing between the opposing sealing surfaces 26, 56 to be progressively reduced with each successive disassembly and reassembly of the seal assembly 1, thereby accommodating the plastic deformation of the flange 64. In other words, in the absence of the leverage feature 29, the blocks 10, 40 would not be able to pivot relative to each other about the leverage feature 29 to account for minor variations in the thickness of the flange 64 following plastic deformation thereof. The existence of the leverage feature 29 thereby extends the useful life of the conduit 60 by allowing the flange 64 to be properly sealed following extended use thereof even in the presence of plastic deformation.

As explained hereinabove, the clamping feature 80 of the seal assembly 1 including the threaded member 82 may be replaced with any form of biasing device suitable for drawing the first block 10 towards the second block 40, such as the use of a clamp (not shown). In the event that a clamp is used, the compressive forces of the clamp are applied to the blocks 10, 40 between the leverage feature 29 and the conduit 60 in similar fashion to the use of the threaded member 82.

Once the flange 64 is suitably compressed between the sealing surfaces 26, 56 to substantially fill the gland 79, the seal assembly 1 forms a continuous and sealed flow path through which a fluid associated with the HVAC system may flow. The fluid may for example flow through the aperture 62 of the conduit 60, the aperture 74 of the insert 70, and the second aperture 46 of the second block 40 before entering internal features of the component 99 to which the second block 40 is formed integrally. The fluid may be a refrigerant conveyed between an upstream component (not shown) of the HVAC system and the component 99 of the HVAC system having the second block 40, for example.

FIGS. 11-14 illustrate various alternative configurations of the seal assemblies according to alternative embodiments of the present invention. In FIG. 11, a seal assembly 101 according to another embodiment of the invention further includes a second conduit 160 in addition to the conduit 60 disposed within the first aperture 30 of the first block 10. The configuration shown in FIG. 11 may be used for forming an in-line fitting of the HVAC system.

The second conduit 160 is substantially identical in form to the conduit 60 while being oppositely arranged. The second conduit 160 includes a radially outwardly extending flange 164 extending adjacent the second sealing surface 56 of the second block 40. The use of the second conduit 160 results in the second aperture 46 of the second block 40 having a slightly enlarged inner diameter in comparison to that shown in FIGS. 1-4 to accommodate the thickness of the second conduit 160. An aperture 162 formed through the second conduit 160 is sized to have an inner diameter equal to that of the aperture 62 extending through the conduit 60. The insert 70 is accordingly able to be frictionally received in each of the aperture 62 of the conduit 60 and the aperture 162 of the second conduit 160.

The second conduit 160 may include the flange 164 preformed prior to insertion of the second conduit 160 or the flange 164 may be formed after first extending a length of the second conduit 160 through the second aperture 46 of the second block 40 before deforming the end of the second conduit 160 radially outwardly such as by means of a molding process.

The embodiment of the seal assembly 101 illustrated in FIG. 11 operates in the same manner as the seal assembly 1 illustrated in FIGS. 1-4, wherein a clamping feature is adjusted to compress each of the flanges 64, 164 between the sealing surfaces 26, 56 to fill a gland formed by the cooperation of the blocks 10, 40. As should be understood, the thickness of each of the flanges 64, 164 may be selected to entirely fill the associated gland when compressed to the design torque of the seal assembly 101 to attain the hydrostatic lock condition of the gland.

Figure 12:
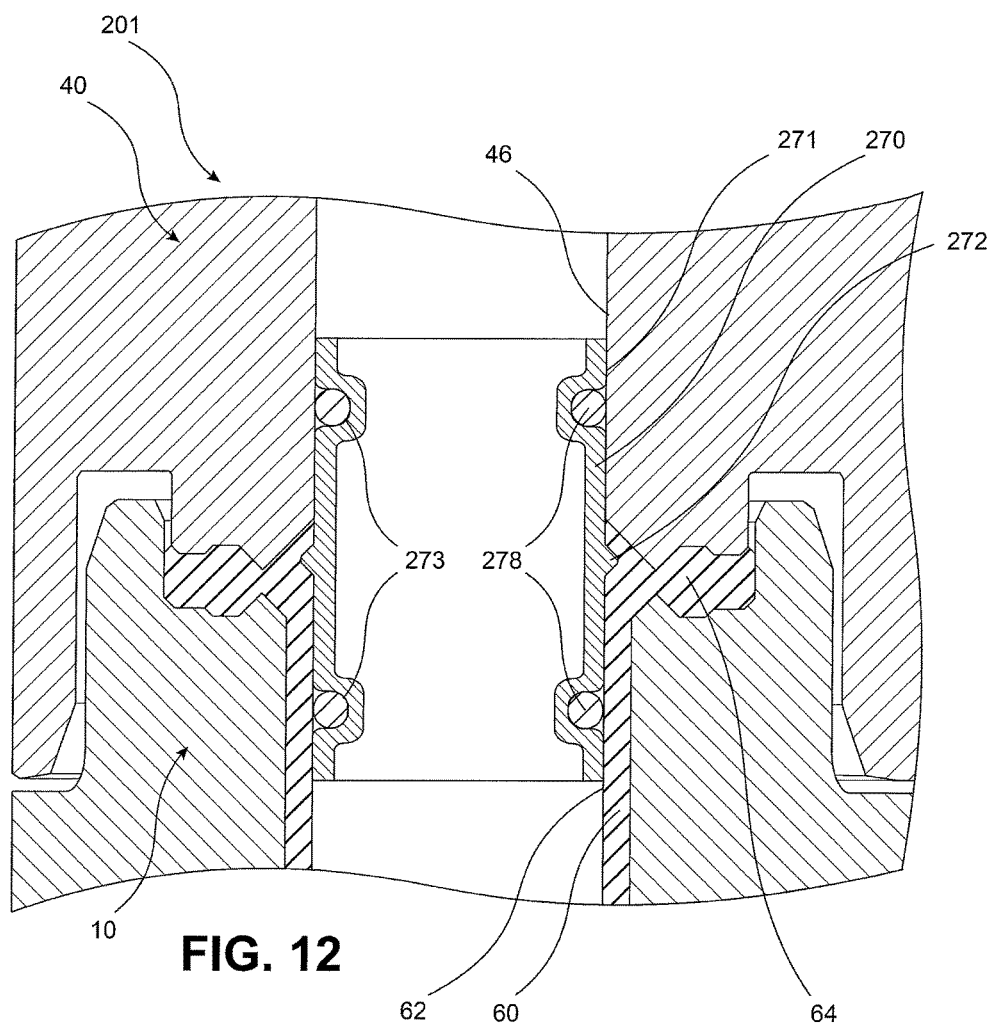
FIG. 12 is an enlarged fragmentary cross-sectional elevational view of a seal assembly including O-rings according to another embodiment of the invention.

FIG. 12 illustrates a seal assembly 201 according to another embodiment of the invention including an insert 270 having at least one radially formed channel 273 circumscribing an outer circumferential surface 271 thereof, wherein the at least one channel 273 is configured to receive an O-ring 278 therein. The insert 270 is shown as including one channel 273 formed to each side of an annular bead 272 circumscribing the outer circumferential surface 271 thereof. A first one of the O-rings 278 sealingly engages each of the insert 270 and the portion of the second block 40 defining the second aperture 46 while a second one of the O-rings 278 sealingly engages each of the insert 270 and the inner surface of the conduit 60 defining the aperture 62 thereof. The O-rings 278 accordingly act as redundant seals to the seal provided by the flange 64 of the conduit 60 compressed between the blocks 10, 40. The seal assembly 201 illustrated in FIG. 12 otherwise operates in the same fashion as the seal assembly 1 illustrated in FIGS. 1-4.

Figure 13:
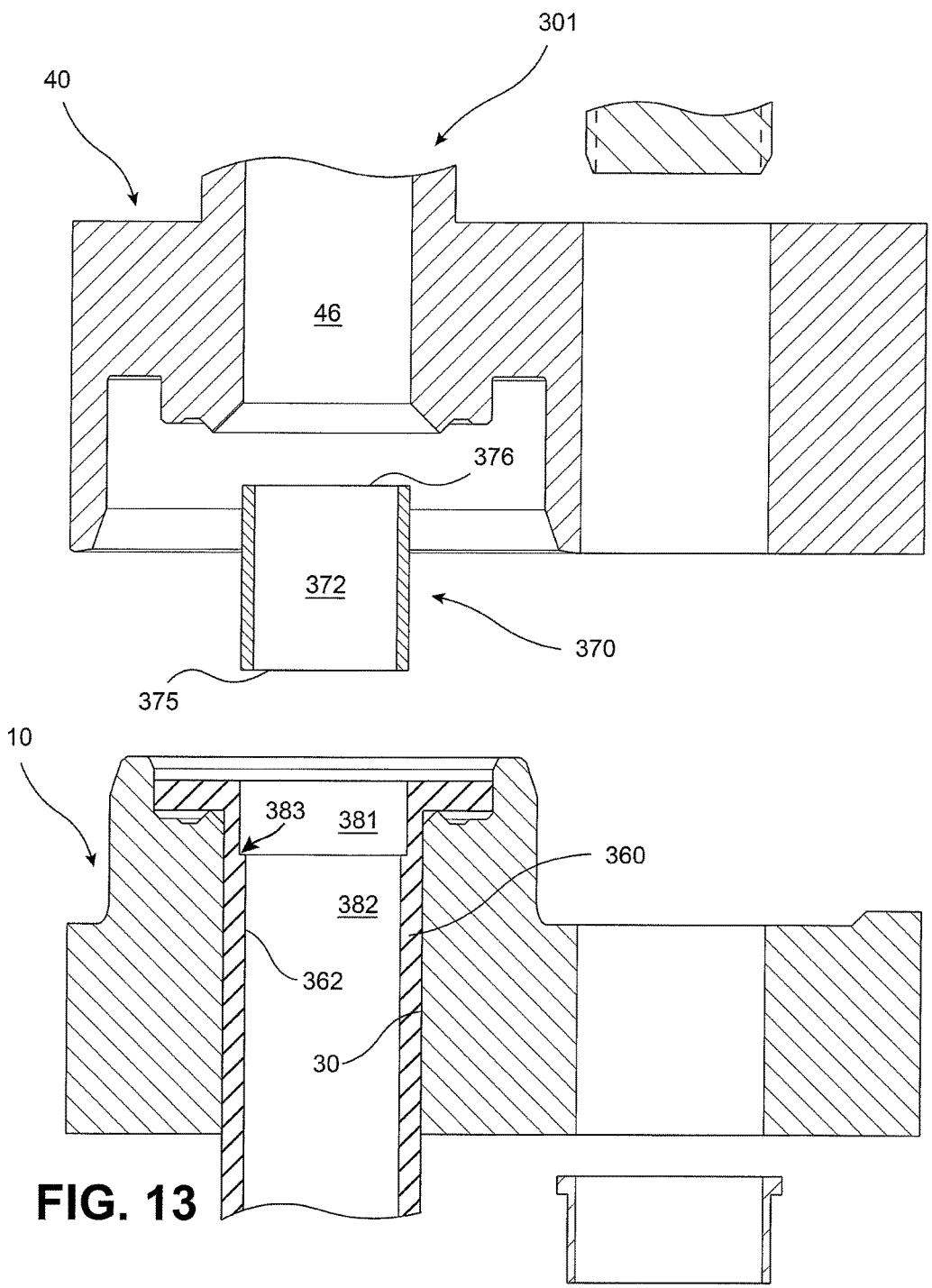
FIG. 13 is a partially exploded cross-sectional elevational view of a seal assembly including a cylindrical insert and a conduit having a shoulder abutting the insert according to another embodiment of the invention.

FIG. 13 illustrates a seal assembly 301 according to another embodiment of the invention including a thin-walled cylindrical insert 370 devoid of an annular bead for establishing a position of the insert 370 relative to a conduit 360 disposed within the first aperture 30 of the first block 10. Instead, the conduit 360 is formed wherein a fluid conveying aperture 362 of the conduit 360 includes a large diameter portion 381 and a small diameter portion 382. The small diameter portion 382 extends along a majority of the aperture 362 until intersecting the large diameter portion 381 at a shoulder 383 formed adjacent an end of the conduit 360. The shoulder 383 establishes a stopping element within the conduit 360 for abutting a first end 375 of the insert 370 when the insert 370 is frictionally received within the large diameter portion 381 of the aperture 362. A second end 376 of the insert 370 is configured to be received within the second aperture 46 of the second block 40. The insert 370 includes an aperture 372 providing fluid communication between the first end 375 and the second end 376 thereof. The seal assembly 301 illustrated in FIG. 13 otherwise operates in the same fashion as the seal assembly 1 illustrated in FIGS. 1-4.

The large diameter portion 381 of the conduit 360 may be formed during the same manufacturing process used to form a radially outwardly extending flange thereof. For example, the aperture 362 of the conduit 360 may originally have an inner diameter equal to that of the small diameter portion 382 along a length thereof and portions of the conduit 360 formed adjacent the flange thereof may be heated to prepare the portions of the conduit 360 for deformation. A tool (not shown) used to perform the deformation of the flange may include a cylindrical shaped projection having an outer diameter corresponding to the large diameter portion 381 of the aperture 362. The projection may then be inserted axially into the aperture 362 to deform the conduit 360 to form the large diameter portion 381 thereof. The projection may extend from a flanged portion of the tool used to outwardly deform the portion of the conduit 360 for forming the flange. Alternative methods of forming the large diameter portion 381 and the small diameter portion 382 may also be used without departing from the scope of the present invention.

Figure 14:
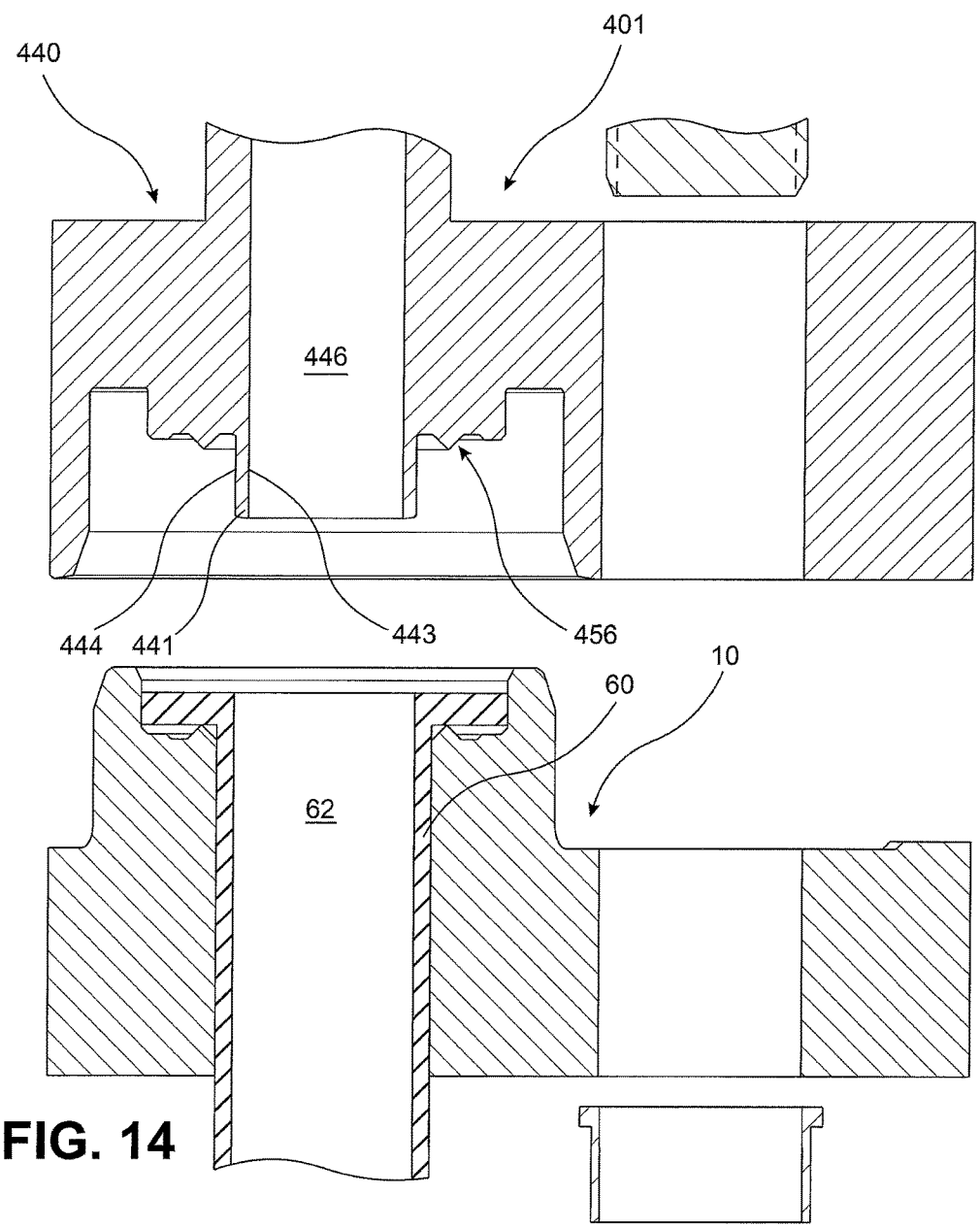
FIG. 14 is a partially exploded cross-sectional elevational view of a seal assembly including an insert formed integrally with one component of the seal assembly according to another embodiment of the invention.

FIG. 14 illustrates a seal assembly 401 according to another embodiment of the invention including a modification of the second block 40 of the seal assembly 1 illustrated in FIGS. 1-4, resulting in the independently formed insert 70 being removed from use in forming the seal assembly 1. Instead, a second block 440 includes an axially extending annular projection 441 extending from a radial inner end of a second sealing surface 456 of the second block 440. The annular projection 441 includes an inner surface 443 defining a portion of a second aperture 446 of the second block 440 and an outer surface 444 having a diameter substantially equal to the diameter of the aperture 62 of the conduit 60. The annular projection 441 forms an insert configured to be frictionally received within the aperture 62 of the conduit 60 as the first block 10 is brought adjacent the second block 440 by means of the force applied by the clamping feature. The seal assembly 401 illustrated in FIG. 14 otherwise operates in the same fashion as the seal assembly 1 illustrated in FIGS. 1-4.

The seal assemblies 1, 101, 201, 301, 401 disclosed herein provide several benefits over the seal assemblies of the prior art. First, the use of plastic conduits capable of fluid tight sealing reduces a cost and weight of the HVAC system including the plastic conduits. Second, the presence of the leverage feature delivers a desired biasing force to the engagement of the sealing surfaces while also furthering the useful life of each of the seal assemblies. Third, the presence of a rigid insert disposed radially inwardly of the flange of each of the conduits enables each of the flanges to be hydrostatically locked within the corresponding gland to prevent undesirable creep of the flange therein.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A seal assembly comprising:
    a first block having a first aperture and a first sealing surface extending radially outwardly from an end of the first aperture;
    a second block having a second aperture and a second sealing surface extending radially outwardly from an end of the second aperture;
    a conduit having a tube portion with an axially extending aperture and a flange extending radially outwardly from an end of the tube portion, the tube portion disposed within the first aperture of the first block and the flange disposed between the first sealing surface of the first block and the second sealing surface of the second block and configured to deform when compressed therebetween; and
    an insert providing fluid communication between the aperture of the tube portion and the second aperture of the second block, wherein the first sealing surface includes an annular first engaging feature configured to engage a first surface of the flange and wherein the second sealing surface includes an annular second engaging feature configured to engage a second surface of the flange formed opposite the first surface thereof, and wherein each of the first engaging feature and the second engaging feature are inwardly tapered projections extending towards the flange.

2. The seal assembly of claim 1, wherein a first end of the insert is received in the aperture of the tube portion and a second end of the insert is received in the second aperture of the second block.

3. The seal assembly of claim 2, wherein an annular bead circumscribes an outer surface of the insert intermediate the first end and the second end thereof, the annular bead configured to abut the flange of the conduit to establish a position of the insert relative to the conduit.

4. The seal assembly of claim 2, wherein the aperture of the tube portion includes a shoulder for abutting the first end of the insert to establish a position of the insert relative to the conduit.

5. The seal assembly of claim 1, wherein the insert is an annular projection formed monolithically with the second block and extending axially from the second sealing surface.

6. The seal assembly of claim 1, wherein each of the inwardly tapered projections is one of sharp and radiused at a distal end thereof.

7. The seal assembly of claim 1, wherein the first engaging feature is radially aligned with the second engaging feature.

8. The seal assembly of claim 1, wherein the first block and the second block are formed of a non-polymeric material and the conduit is formed of a polymeric material.

9. The seal assembly of claim 8, wherein the conduit is formed of at least one of a thermoplastic material, a thermoset material, and a thermoplastic elastomer material.

10. The seal assembly of claim 8, wherein the conduit is formed from one of polyethylene, polypropylene, polyketone, polyethylene terephthalate, polyamide, polyphenylene sulfide, and combinations thereof.

11. The seal assembly of claim 1, further comprising a clamping feature configured to apply a force to the first block and the second block compressing the flange of the conduit between the first sealing surface and the second sealing surface.

12. The seal assembly of claim 11, wherein one of the first block and the second block includes a leverage feature projecting therefrom, the leverage feature spaced apart laterally from an axis of the first aperture and configured to engage the other of the first block and the second block when the flange is compressed between the first sealing surface and the second sealing surface.

13. The seal assembly of claim 12, wherein the clamping feature applies the force to the first block and the second block along an axis formed between the axis of the first aperture and the engagement of the leverage feature and the other of the first block and the second block when the flange is compressed between the first sealing surface and the second sealing surface.

14. The seal assembly of claim 1, wherein one of the first block and the second block includes an axial surface extending from one of the first sealing surface and the second sealing surface toward the other of the first sealing surface and the second sealing surface, wherein the axial surface, the first sealing surface, the second sealing surface, and the insert cooperate to define an annular gland for receiving the flange of the conduit.

15. The seal assembly of claim 14, wherein the flange is configured to deform to fill an entirety of the annular gland to hydrostatically lock the flange within the annular gland when the flange is compressed between the first sealing surface and the second sealing surface.

16. The seal assembly of claim 1, wherein one of the first block and the second block is formed integrally with a component of a heating, ventilation, and air-conditioning system and the other of the first block and the second block is formed independently of the component of the heating, ventilation, and air-conditioning system.

17. A seal assembly comprising:
a first block having a first aperture and a first sealing surface extending radially outwardly from an end of the first aperture;
a second block having a second aperture and a second sealing surface extending radially outwardly from an end of the second aperture;
a conduit having a tube portion with an axially extending aperture and a flange extending radially outwardly from an end of the tube portion, the tube portion disposed within the first aperture of the first block and the flange disposed between the first sealing surface of the first block and the second sealing surface of the second block and configured to deform when compressed therebetween; and
an insert providing fluid communication between the aperture of the tube portion and the second aperture of the second block, wherein at least one of the first sealing surface and the second sealing surface includes a cavity, the cavity forming an indentation configured to receive at least a portion of the flange of the conduit when the flange is deformed in response to the flange being compressed between the first sealing surface and the second sealing surface.

18. A seal assembly comprising:
a first block having a first aperture and a first sealing surface extending radially outwardly from an end of the first aperture;
a second block having a second aperture and a second sealing surface extending radially outwardly from an end of the second aperture;
a conduit having a tube portion with an axially extending aperture and a flange extending radially outwardly from an end of the tube portion, the tube portion disposed within the first aperture of the first block and the flange disposed between the first sealing surface of the first block and the second sealing surface of the second block and configured to deform when compressed therebetween; and
an insert providing fluid communication between the aperture of the tube portion and the second aperture of the second block, wherein the first block includes an annular rim surrounding the first sealing surface and the second block includes an annular groove surrounding the second sealing surface, the annular rim configured to be received within the annular groove when the flange is compressed between the first sealing surface and the second sealing surface.

* * * * *